US 6,668,920 B2

(12) United States Patent
Setterberg, Jr.

(10) Patent No.: US 6,668,920 B2
(45) Date of Patent: Dec. 30, 2003

(54) WELLSCREEN HAVING HELICAL SUPPORT SURFACE

(75) Inventor: John Richard Setterberg, Jr., Dallas, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 80 days.

(21) Appl. No.: 10/007,862

(22) Filed: Nov. 9, 2001

(65) Prior Publication Data

US 2003/0089503 A1 May 15, 2003

(51) Int. Cl.$^7$ ............................................... E21B 43/08
(52) U.S. Cl. ........................ 166/228; 166/230; 428/57
(58) Field of Search ........................ 166/227, 230, 166/231, 236, 228; 29/896, 62; 428/57

(56) References Cited

U.S. PATENT DOCUMENTS

| 1,729,135 A | | 9/1929 | Slauson |
| 5,833,853 A | | 11/1998 | Carlson ................. 210/497.01 |
| 5,893,956 A | | 4/1999 | Perry, Jr. et al. ............ 156/167 |
| 5,899,271 A | * | 5/1999 | Simone et al. .............. 166/230 |
| 5,909,773 A | | 6/1999 | Koehler et al. ............. 166/277 |
| 6,517,924 B1 | * | 2/2003 | Kameda et al. ............. 428/138 |
| 2002/0104217 A1 | * | 8/2002 | Echols et al. ............ 29/896.62 |

FOREIGN PATENT DOCUMENTS

WO  WO 00/20096  4/2000  .......... B01D/39/14

OTHER PUBLICATIONS

International Search Report, International Application No. PCT/GB 02/05041, dated Jan. 29, 2003.

* cited by examiner

Primary Examiner—William Neuder
(74) Attorney, Agent, or Firm—Moser, Patterson & Sheridan, L.L.P.

(57) ABSTRACT

A method and apparatus for assembling a wellscreen onto a perforated base pipe are provided. The wellscreen defines a tubular body which is suitable for subterranean use in oil, gas, and water wells. In accordance with the present invention, the wellscreen first defines a perforated base pipe having termination members at its opposite ends. Disposed on each termination member is a continuous helical, step-tiered surface. The helical surface serves as a support surface for a layer of filtering material which is rolled around the base pipe. The filtering material is pre-cut to a correct diameter and bias to match the diameters and bias of the spiraling termination support surfaces. The filtering material is connected to the rings to form a substantial seal on the opposite ends. A protective, perforated outer shroud is optionally disposed around the filtering media as well.

10 Claims, 4 Drawing Sheets

WELLSCREEN HAVING HELICAL SUPPORT SURFACE

BACKGROUND OF THE INVENTION

1. Field of the Invention

The present invention relates to well completion methods. More specifically, the present invention relates to an apparatus and method for assembling a wellscreen for use in oil, gas, and water wells.

2. Description of the Related Art

Wellbores are typically formed by drilling a borehole into the earth in order to penetrate one or more hydrocarbon-bearing formations. Typically, the wellbore is supported by one or more strings of steel casing which extend from the surface to a desired depth. An annular area is created between the casing and the borehole, which is filled with cement to further support and form the wellbore.

Some wells are produced by perforating the casing of the wellbore at selected depths where hydrocarbons are found. Hydrocarbons migrate from the formation, through the perforations, and into the cased wellbore. In some instances, a lower portion of a wellbore is left open, that is, it is not lined with casing. This is known as an open hole completion. In that instance, hydrocarbons in an adjacent formation migrate directly into the wellbore where they are subsequently raised to the surface, either by production pressure or through an artificial lift system.

One problem typically encountered in connection with production of downhole fluids is the invasion of aggregate material, including sand, into the wellbore. Sand production can result in premature failure of artificial lift and other downhole and surface equipment. Sand can also build up in the tubing to obstruct well flow. In addition, produced sand becomes difficult to handle and dispose at the surface.

The need to remove aggregates from production fluids exists in many types of wells, including oil and gas wells, water wells, geothermal wells, and wells for ground remediation. Typical particulates needing to be filtered out are sand and clay including unconsolidated particulate matter, also known as "formation sand".

To control particle flow from unconsolidated formations, well screens are often employed downhole. These well screens serve as subterranean particle filters, and are conventionally referred to as "sand screens." Sand screens have been utilized in the petroleum industry for some time to remove particulates from production fluids.

Sand screens are typically tubular in shape and serve as a filtering barrier between a formation and a string of tubing or production equipment. Modern sand screens are typically constructed from three composite layers. These include a perforated base pipe, at least one porous filter media wrapped around and secured to the base pipe, and an outer cover. The filter media allows hydrocarbons to invade the wellbore, but filters sand and other unwanted particles from entering.

The sand screen is connected to the lower end of either the casing or the production tubing. Hydrocarbons travel to the surface of the well through the sand screen and via the tubing. Thus, hydrocarbons or other production fluid are filtered before entering the production string and before traveling through expensive production and pumping equipment.

A typical method of constructing a wellscreen involves wrapping and seam-welding mesh layers of filtering material around the perforated base pipe. The mesh layers typically consist of sintered mesh filter elements and more coarse wire mesh drainage elements. An alternative method involves forming a tube of the mesh material, seam welding it longitudinally, and then sliding it over the perforated base pipe. A protective outer shroud consisting of a perforated tube is then placed over the mesh layers and the perforated base pipe.

FIG. 1 shows a previous version of a perforated base pipe 12 for a prior art well screen 10. The base pipe 12 defines a tubular body having a plurality of perforations 14 therein. The base pipe 12 includes a central bore extending from a first end 20A to a second end 20B. At each opposite end 20A, 20B of the base pipe 12 is a termination member 16. Each termination member 16 defines a series of concentric step-tiered rings 22 having progressively larger diameters. As shown in FIG. 2, the step-tiered rings 22 of the prior art serve as support members for layers of filter screen 24 and the protective shroud (not shown) which will encompass the base pipe 12 upon completion of the well screen 10.

A disadvantage to known well screens 10 is the cumbersome manufacturing process. To assemble the wellscreen 10, the step-tiered rings 22 of the prior art perforated base pipe 12 (FIG. 1) require that the layers of filter screen 24 (shown in FIG. 2) be individually sized to fit each sequential tier on the termination members 22. This means that each layer of filter screen 24 must be cut in separate pieces in accordance with the specific diameter of each corresponding step ring 22. After being cut, the layers of filter screen 24 must be separately welded to each corresponding step ring 22, starting with the smallest diameter ring 22' located at the base of the termination member 16, and moving up sequentially to each successively larger diameter ring 22 until the step ring having the largest diameter 22" has been fitted for a layer of filter screen 24. This process results in many individual sections of mesh material 24 being separately cut and welded to the corresponding step-tiered rings 22 of the termination members 16.

FIG. 2 depicts an intermediate layer of filter media 22 being applied to a step ring 22 of a prior art base pipe 12. The step is repeated for each step ring 22. Thus, in the manufacturing process of the prior art, a plurality of layering and welding steps are required. These numerous steps represent a labor-intensive process that is both expensive and time consuming. In addition, this process also requires a greater degree of skill from the technicians in manufacturing and maintenance.

Therefore, a need exists for a perforated tubular that enables quicker and easier fabrication welding of filter screen layers to the step rings. There is a further need for a well screen that enables the filter layers to be prepared offline for easier assembly at the shop or well site. In addition, there is a need for a method for assembly of the filter screen layers onto a helical step-tiered surface in one continuous feed welding operation.

Further yet, there is a need for a method of manufacturing a sand screen which is less expensive, and which requires less time to manufacture, assemble, and maintain than known sand screens.

SUMMARY OF THE INVENTION

The present invention first relates to an improved filtering device for filtering particulates from fluid. In the preferred embodiment, the apparatus serves as a wellscreen for filtering sand and other aggregates during production of hydrocarbons from a downhole formation.

The wellscreen first comprises a perforated base pipe. At each opposite end of the base pipe is disposed a frustoconical termination member. The termination member includes a helical step-tiered surface, which serve as a support for an intermediate filtering media for the wellscreen. Thus, unlike the individual step-type rings of the prior art, the present invention offers an outer spiraling surface. In accordance with the present invention, the spiraled step surface forms a continuous helical pattern, allowing the filtering media to be spooled and attached onto the termination members during manufacturing. Thereafter, an outer protective perforated shroud may optionally be added.

The present invention also relates to a method for assembling a wellscreen. A pre-slotted base pipe is utilized as the base member for the wellscreen fabrication. As described above, a frusto-conical termination member is disposed at each opposite end of the base pipe. The termination member includes a spiraled step surface, which serves as a support surface for an intermediate filtering layer for the wellscreen. In accordance with the present invention, the spiraled step surface forms a continuous helical pattern, allowing a filtering media to be dispensed and attached onto the termination members in a single roll.

The base pipe, including the opposite termination members, is positioned onto a spool. The filtering layer is then cut and fed through a tensioning roller and attached onto the smallest diameter of the termination members. Thereafter, the spool is rotated so as to roll the filtering media onto the tiers of the termination members.

An outer protective perforated shroud may optionally be added to the base pipe and filtering media. The filtering media and the outer shroud are preferably welded onto the termination members to form a secure containment for the base pipe.

The completed wellscreen is designed to serve as an inlet port for production fluids in a downhole wellbore. Accordingly, the wellscreen is positioned in series with a string of production tubing or, in an open-hole completion, a string of casing, downhole. The wellscreen thus defines a multi-layered tubular, allowing fluids to be filtered and to enter production tubing. In one embodiment, the wellscreen includes a threaded pipe section at least one end to facilitate the fluid connection of the wellscreen to the production tubing.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6 demonstrates that the filtering media is pre-cut to the correct diameter for rolling onto the perforated base pipe. In this view, the initial portion of the filtering media has covered the perforations of the base pipe.

DETAILED DESCRIPTION OF THE PREFERRED EMBODIMENT

Figure 1:
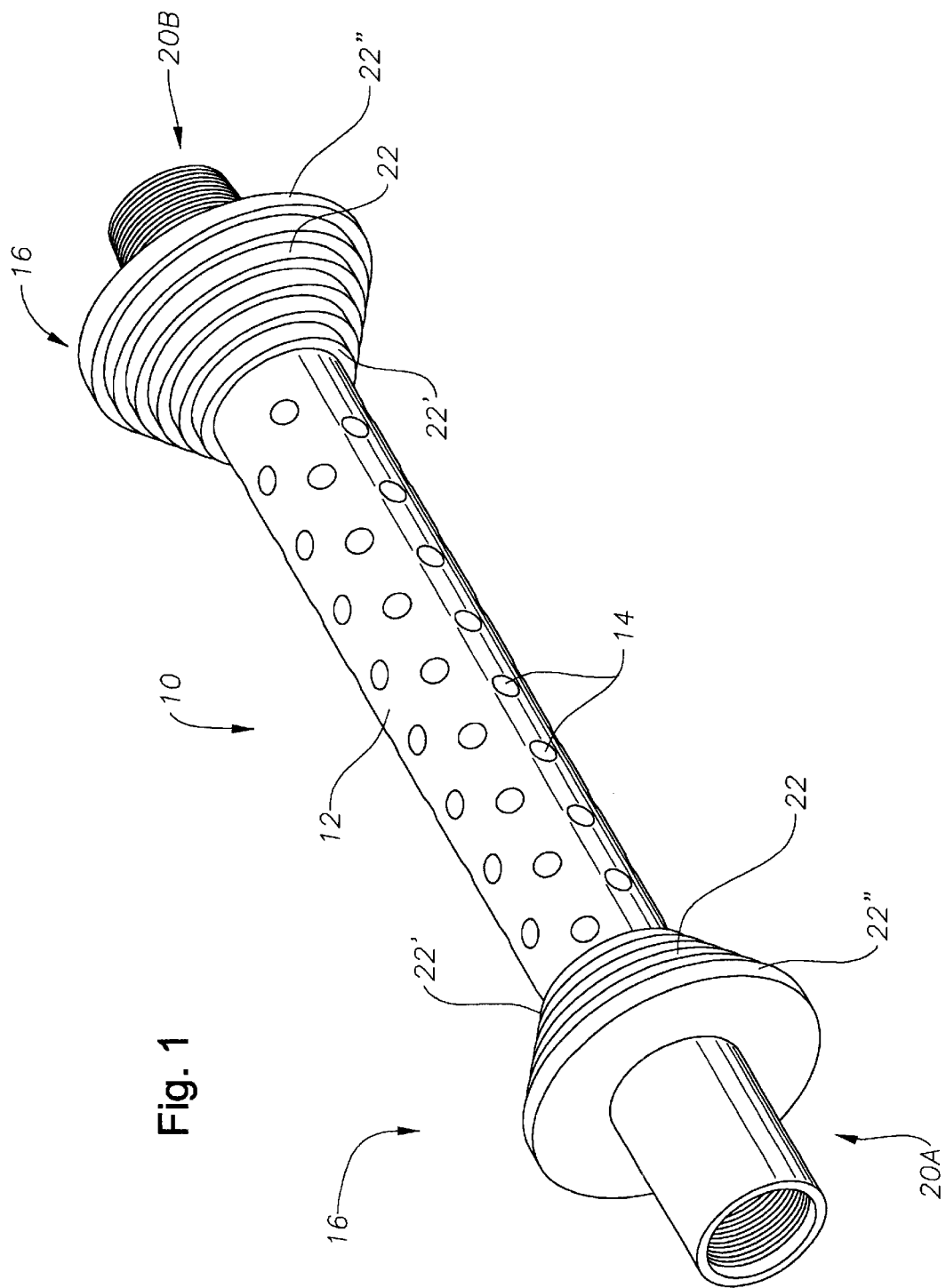
FIG. 1 is an exploded view of a prior art version of a perforated base pipe for a wellscreen. Step-tiered pyramid rings are disposed on opposite termination members.
Figure 2:
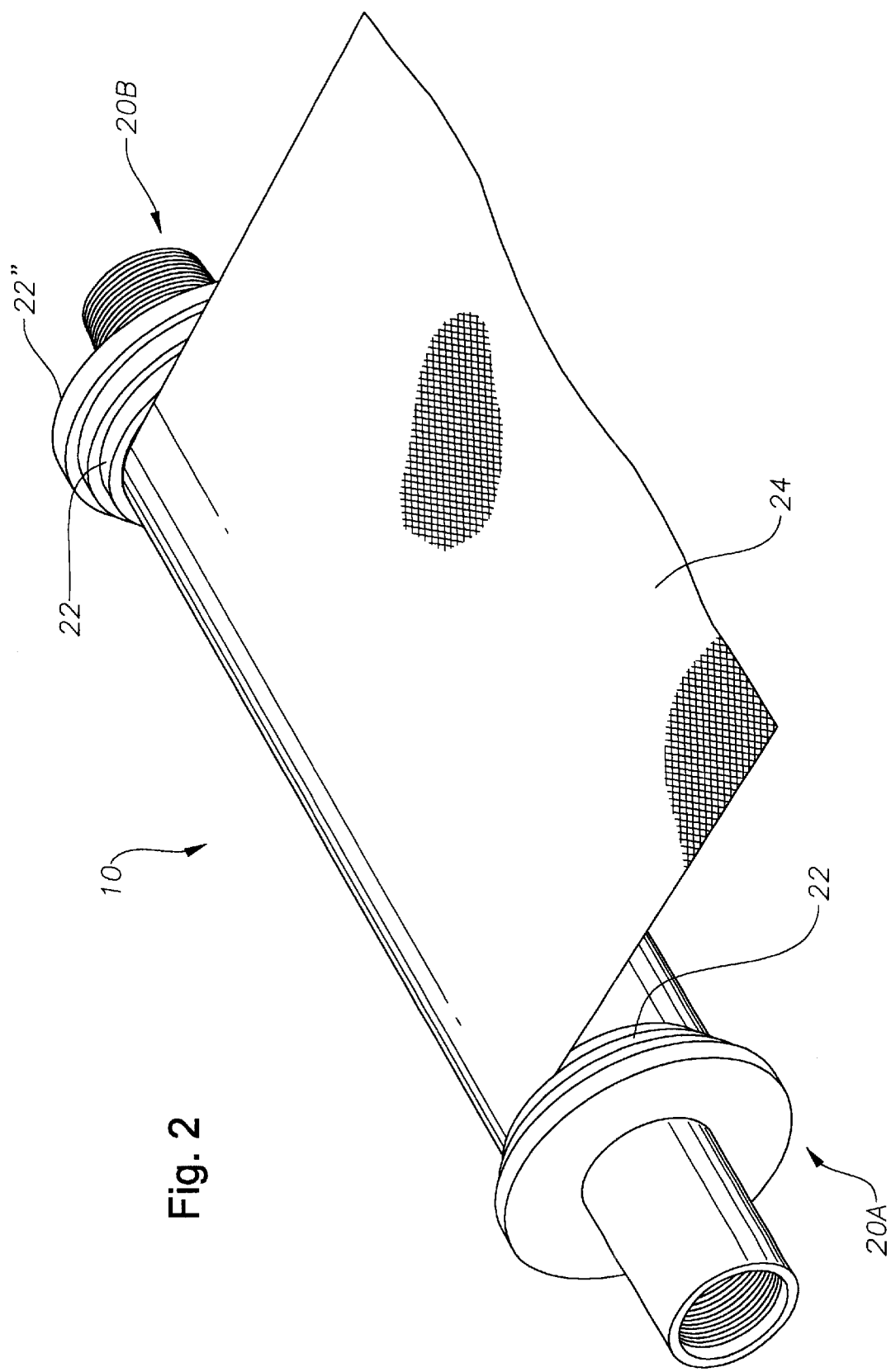
FIG. 2 is also a prior art version of a portion of a wellscreen. Visible is a layer of filtering media being placed onto a single step-tiered ring.
Figure 3:
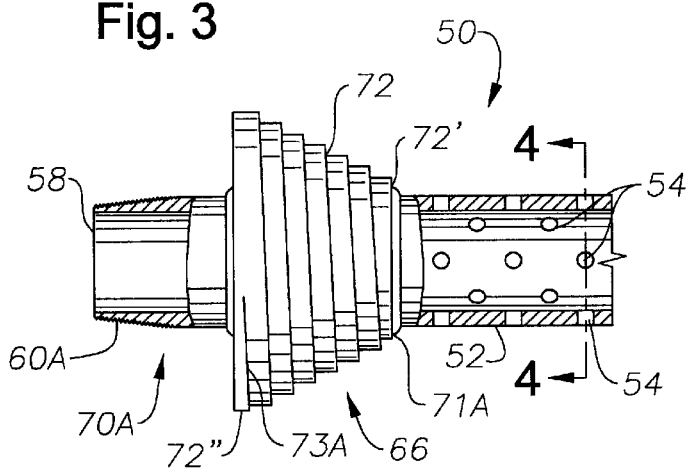
FIG. 3 is a plan view of an end of a base pipe of the present invention. At the depicted end of the base pipe is a termination member having a helical step surface.

FIG. 3 is a plan view of an end 70A of a wellscreen 50 of the present invention. The wellscreen 50 first includes a base pipe 52 having a plurality of slots, or perforations, 54 formed therein. The diameter and the number of perforations 54 may vary depending on the particular operation.

At the depicted end 70A of the base pipe 52 is a termination member 66. The termination member 66 is connected to and resides at the end 70A of the base pipe 52. The termination member 66 is generally frustoconical in shape, and has disposed thereon a continuous helical step surface 72. As will be shown in FIG. 5, the helical step surface 72 serves as a support member for an intermediate filtering media 74.

In accordance with the present invention, the spiraled step surface 72 defines a continuous helical pattern. To accomplish this, each of the two helical support surfaces, steps, 72 first has a lead point 71A, 71B on a first step-tier 72'. The lead point 71A, 71B is the point at which the leading edge 76 of the filtering material 74 is overlaid onto each termination member 66. Further, each of the two helical support surfaces 72 has an end point 73A, 73B on a last step-tier 72". This is the point at which the trailing edge 80 of the filtering material 74 is overlaid onto the termination member 66. Thus, each support surface 72 defines a series of outer spiraling support steps having a lead point 71A, 71B and an end point 73A, 73B, such that the diameter of each termination member 66 grows larger as the helical support surface 72 progresses from the lead point 71A, 71B to the end point 73A, 73B.

Figure 5:
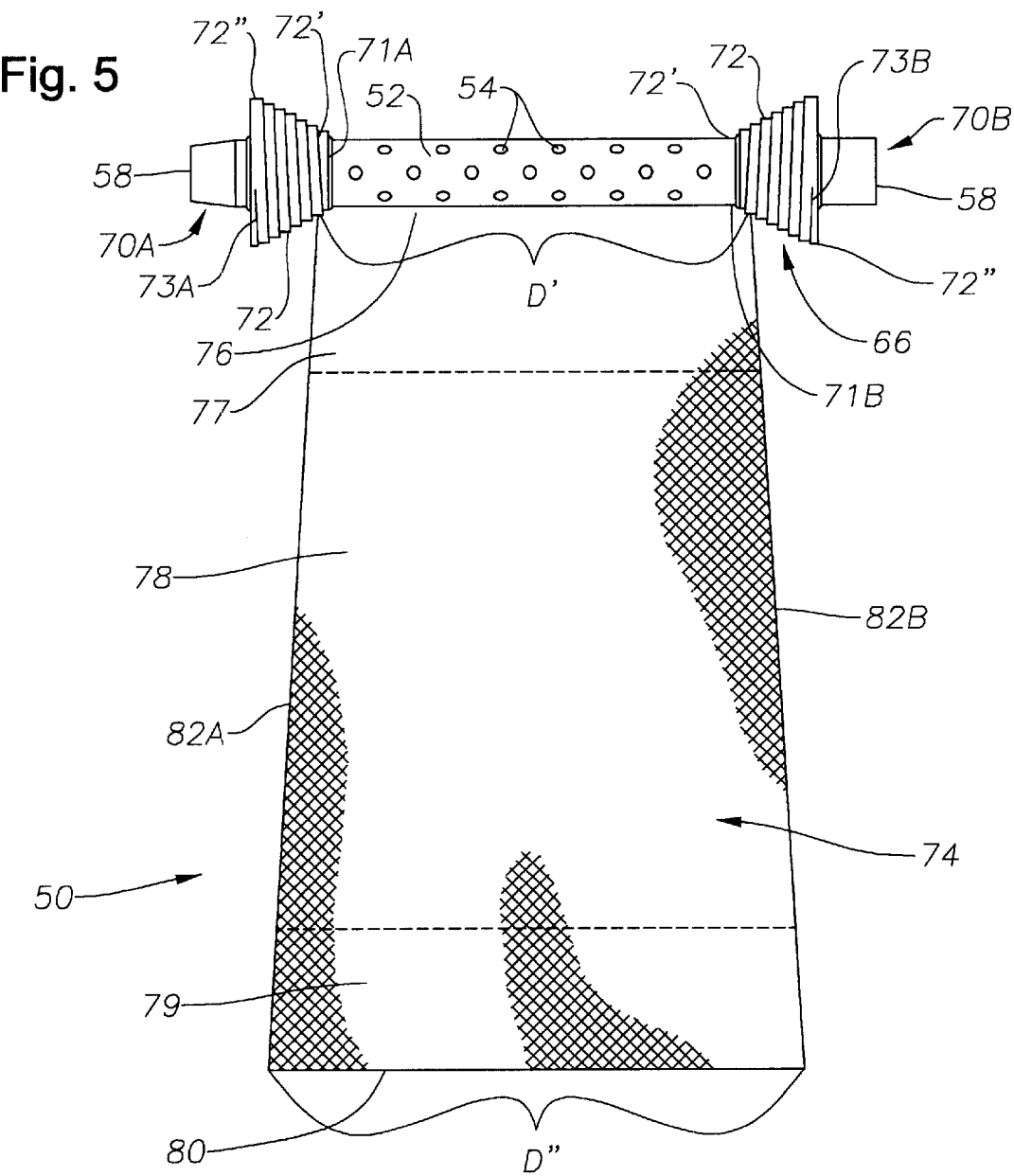
FIG. 5 is a perspective view of a wellscreen of the present invention being assembled. A base pipe for the wellscreen is shown, having opposite termination members. A filtering media is also shown, ready to be spooled onto the spiraled surfaces residing on the termination members.

FIG. 5 demonstrates that the first step-tier 72' on the termination member 66 is positioned closest to the perforations 54 of the base pipe 52, and has the smallest diameter. In this respect, the lead point 71A, 71B is proximal to the perforations 54. The last step-tier 72" is positioned farthest from the perforations 54 of the base pipe 52 and has the largest diameter. There is at least one step-tier 72 intermediate the first 72' and last 72" step tiers forming a helical pattern. The helical pattern allows the filtering media 74 to be spooled onto the termination members 66, either as a single sheet of material or as a series of spooled sections. Thus, the wellscreen 50 of the present invention differs from wellscreens of the prior art 10, in that the wellscreen 50 of the present invention does not utilize separate concentric step-tiered rings 22 for supporting a large number of separate filtering media 24 layers.

The perforated base pipe 52 defines a tubular body having an inner bore 58 for transmitting fluids within the wellbore (not shown) to the surface. In the depiction of FIG. 3, bore 58 in end 70A defines a port for fluid flow. A threaded connector 60A is provided to allow a threaded connection with production string (not shown). In the embodiment of FIG. 3, threaded connector 60A defines a male coupling. However, it is within the scope of this invention to provide a wellscreen 50 which is placed in series with the casing (not shown).

Figure 4:
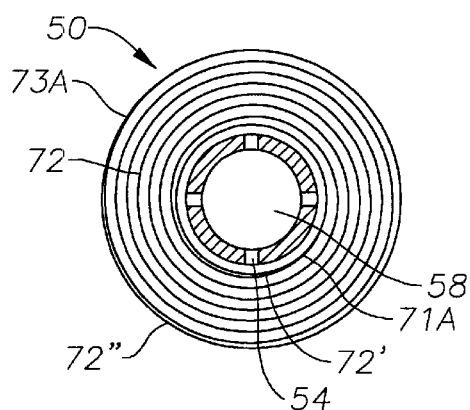
FIG. 4 is a cross sectional view of a wellscreen taken along line 4—4 of FIG. 3.

FIG. 4 is a cross sectional view of a well screen 50 taken along line 4—4 of FIG. 3. The bore 58 of the base pipe 52 is seen centrally. Also visible is the continuous helical step surface 72, starting with the smallest step-tier 72', and terminating at the end with the largest step-tier 72". In the design for the present invention, the helical step surface actually defines a continuous spiral.

FIG. 5 is a plan view of a wellscreen 50 of the present invention being assembled. The base pipe 52 for the wellscreen 50 is shown, having a central bore 58 and a plurality of perforations 54. The base pipe 52 also includes opposite termination members 66. The entire length of filtering media 74 is also shown, ready to be spooled onto the spiraled rings 72 residing on the termination members 66.

Both termination members 66 are visible in FIG. 5. The termination members are disposed on opposite ends 70A and 70B of the wellscreen 50. In the preferred embodiment, each end 70A, 70B also defines a communication member for providing a fluid seal with the production tubing (not shown). For example, one end 70A could define the male portion of a threaded coupling 60A (threads shown in FIG. 3), and one end 70B could define the female portion of a threaded coupling (threads not shown).

Each termination member 66 has a first step step-tier 72' having a smallest diameter. The distance between the two first step step-tier 72' is identified as D'. Each termination member 66 also has a last step-tier 72" having a largest diameter. The distance between the two second step-tiers 72' is identified as D". Intermediate each first 72' and last 72" step-tiers is at least one intermediate step-tier 72. Each successive step-tier (72' to 72") thus increases in diameter as the outer surface of the termination member 66 spirals.

Figure 6:
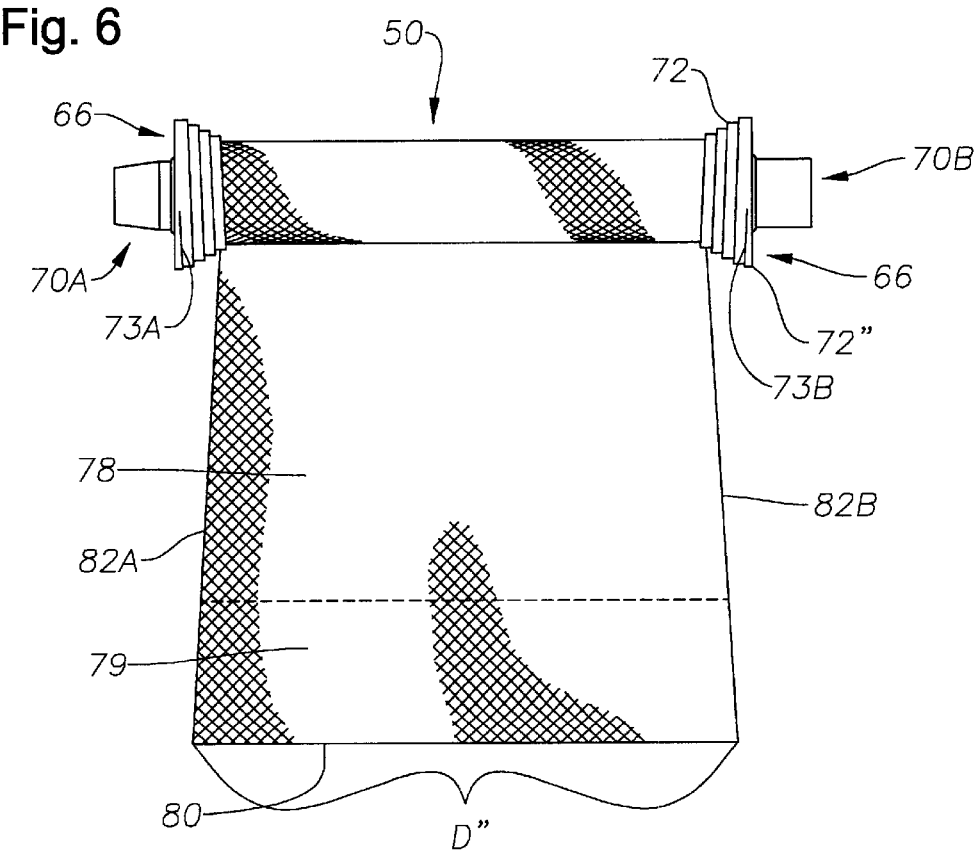
FIG. 6 is a plan view of the wellscreen of FIG. 5, with the filtering media being spooled onto the spiraled surfaces of each end.

FIG. 6 is a plan view of a wellscreen 50 of the present invention being assembled. In this view, the perforations of the base pipe 52 for the wellscreen 50 have been covered by the initial section 77 of filtering media 74. Likewise, the smallest step-tier 72' has been covered. However, additional levels of the step-tiers 72 remain to be covered during assembly, including the largest step-tier 72".

As can be seen in FIG. 5 and FIG. 6, the filtering layer 74 has been pre-cut to match the diameters and bias of the step surface 72. Thus, the filtering layer at its leading edge 76 has a width of D'. The filtering media then tapers outwardly so that at its trailing edge 80 the filtering media has a width of D". In this arrangement, side edges 82A and 82B define a pair of opposite hypotenuse sides which match the helix angle of the helical support surface. The bias angles of edges 82A and 82B match the lead angles of the spiral surfaces 72 on termination members 66.

The filtering media 24 for wellscreens 10 of the prior art consists of various layers of drainage mesh and filter mesh layered together in an alternating fashion. The filtering layers essentially define sections of sintered and non-sintered mesh. It is noted that the sintering process involves increasing the temperature of the various components to approximately eighty percent of the melting temperature and fusing the components together. The respective ends of the filtering media layers are wrapped onto corresponding step-tiered rings 22, and welded or otherwise connected to the termination members 16. The alternating layers of the various meshes ensure filtering without restricting the flow of fluids into and along the surface of the wellscreen.

In the wellscreen 50 of the present invention, alternating layers 74 of sintered and non-sintered mesh are still employed. The lead section 77 of filtering media 74 is preferably a non-sintered piece, and is the piece used to attach to the first step-tier 72'. Attachment is preferably by welding. The base pipe 52 is spooled so as to draw the filtering media 74 around the perforations 54. As the filtering media 74 is spooled, the intermediate helical surface 72 is invoked for support. The intermediate section 78 of filtering media is, in the preferred embodiment, a sintered mesh material. During the spooling process, the side edges 82A, 82B of the filtering media are preferably welded to the helical surface 72. The filtering media material 74 is sized so that the trailing edge 80 will cover the last step-tier 72". Preferably, the last section 79 of filtering media 74 is a non-sintered mesh.

Figure 7:
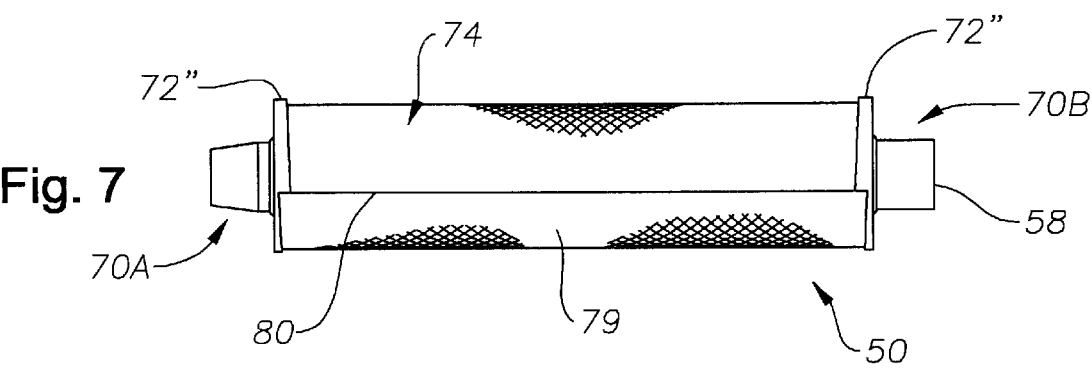
FIG. 7 is a plan view of the base pipe of the present invention having a continuous helical surface on each end. In this view, the wellscreen has been completely rolled onto the base pipe.

FIG. 7 is a plan view of the wellscreen 50 of the present invention after the filtering material 74 has been completely rolled onto the perforated base pipe 52. Trailing edge 80 of the filtering materials 74 is visible. Thereafter, an outer protective perforated shroud (not shown) may optionally be added.

The present invention also discloses a method for creating a wellscreen. According to the present method, a perforated base pipe 52 is utilized as the base member for the wellscreen 50 fabrication. As described above, a frustoconical termination member 66 is disposed at each opposite end of the base pipe 52. Each termination member 66 includes a continuous helical step surface 72, which serves as a support for a filtering layer 74 for the wellscreen 50. In accordance with the present invention, the helical step surface 72 forms a continuous spiral pattern, allowing a filtering media 74 to be dispensed onto the termination members 66 in a single roll.

While it is contemplated that the sintered 78 and non-sintered 77, 79 portions of the filtering material 74 would be fabricated into a single continuous roll, it is within the scope of this invention to provide separately cut sections of sintered and non-sintered material which would be rolled in proper order. In this embodiment, the filtering material 74 would be a plurality of continuous layers, preferably comprising alternating sintered 78 and non-sintered 77, 79 sections.

The base pipe 52, including the opposite termination members 66, is positioned onto a spool (not shown). The pre-cut filtering layer 74 is then fed through a tensioning roller onto the smallest step-tier 72' of the termination members 66 from a tensioning roller (also not shown). Thereafter, the spool is rotated so as to roll the filtering media 74 onto the rings 72 of the termination members 66.

An outer protective perforated shroud may optionally be added to the base pipe 52 and filtering media 74. The filtering media 74 and the outer shroud are preferably welded onto the termination members 66 to form a secure containment for the perforated base pipe 52.

At this point, the perforated base pipe 52 with spiraling surface 72 is now assembled into wellscreen 50 of the present invention, and can be placed into the appropriate position in the production tubing string (not shown). The completed wellscreen is designed to serve as an inlet port for production fluids in a downhole wellbore. Accordingly, the wellscreen 50 is preferably positioned in series with a string of production tubing downhole. The wellscreen 50 thus defines a multi-layered tubular, allowing fluids to be filtered as they enter the production tubing. In one embodiment, the wellscreen includes a threaded pipe section at least one end to facilitate the fluid connection of the wellscreen to the production tubing.

While the foregoing is directed to embodiments of the present invention, other and further embodiments of the invention may be devised without departing from the basic scope thereof, and the scope thereof is determined by the claims that follow.

What is claimed is:

1. A filtering material for disposal around a base pipe, the filtering material comprising:
   at least two sections including:
      a first section with an upper and lower end; and
      a second section with an upper and lower end, whereby the first and second sections are attached end to end to form a single, longer section and, wherein the first and second sections are of a different filter type.

2. The filtering material of claim 1, wherein each of the at least two sections is constructed and arranged to cover a periphery of the base pipe as the filtering material is rolled onto the base pipe.

3. The filtering material of claim 2, further including a third section with an upper and lower end, whereby the upper end of the third section is attached to the lower end of the second section.

4. The filtering material of claim 3, wherein the first and third sections comprise a non-sintered porous material and the second section comprises a sintered material.

5. The filtering material of claim 3, wherein the first and third sections comprise material that is more permeable than the material of the second section.

6. The filtering material of claim 3, wherein the first and third sections are drainage sections and the second section is a filter section.

7. The filtering material of claim 3, wherein the filtering material has a progressively tapered width, whereby the width at the lower end of the third section is greater than the width at the upper end of the first section.

8. The filtering material of claim 3, wherein the filtering material is attached to a helical sup ort formed at each end of the base pipe.

9. A filtering material for disposal around a base pipe, the filtering material comprising:
   at least two sections including:
      a first section with an upper and lower edge;
      a second section with an upper and lower edge, whereby the lower edge of the first section is attached to the upper edge of the second section and, wherein the first and second sections are of a different filter type and each of the at least two sections is constructed and arranged to cover a periphery of the base pipe as the filtering material is rolled onto the base pipe; and
      a third section with an upper and lower edge, whereby the upper edge of the third section is attached to the lower edge of the second section, wherein the first and third sections comprise a non-sintered porous material and the second section comprises a sintered material.

10. A filtering material for disposal around a base pipe, the filtering material comprising:
    at least two sections including:
       a first section with an upper and lower edge;
       a second section with an upper and lower edge, whereby the lower edge of the first section is attached to the upper edge of the second section and, wherein the first and second sections are of a different filter type and each of the at least two sections is constructed and arranged to cover a periphery of the base pipe as the filtering material is rolled onto the base pipe; and
       a third section with an upper and lower edge, whereby the upper edge of the third section is attached to the lower edge of the second section, wherein the filtering material has a progressively tapered width, whereby the width at the lower edge of the third section is greater than the width at the upper edge of the first section.

* * * * *

UNITED STATES PATENT AND TRADEMARK OFFICE
CERTIFICATE OF CORRECTION

PATENT NO.     : 6,668,920 B2
DATED          : December 30, 2003
INVENTOR(S)    : Setterberg, Jr.

It is certified that error appears in the above-identified patent and that said Letters Patent is hereby corrected as shown below:

<u>Column 8,</u>
Line 2, please change "sup ort" to -- support --.

Signed and Sealed this

Sixth Day of July, 2004

JON W. DUDAS
*Acting Director of the United States Patent and Trademark Office*